(12) United States Patent
Ergin

(10) Patent No.: US 12,102,261 B2
(45) Date of Patent: Oct. 1, 2024

(54) PORTABLE ROTISSERIE SPIT

(71) Applicant: BULVAR PLASTIK AMBALAJ GIDA INSAAT TURIZM MAKINE SANAYII VE TICARET LIMITED SIRKETI, Istanbul (TR)

(72) Inventor: Selma Ergin, Istanbul (TR)

(73) Assignee: BULVAR PLASTIK AMBALAJ GIDA INSAAT TURIZM MAKINE SANAYII VE TICARET LIMITED SIRKETI, Istanbul (TR)

( * ) Notice: Subject to any disclaimer, the term of this patent is extended or adjusted under 35 U.S.C. 154(b) by 741 days.

(21) Appl. No.: 17/290,802

(22) PCT Filed: Oct. 31, 2019

(86) PCT No.: PCT/TR2019/050912
§ 371 (c)(1),
(2) Date: May 3, 2021

(87) PCT Pub. No.: WO2020/091717
PCT Pub. Date: May 7, 2020

(65) Prior Publication Data
US 2021/0401225 A1    Dec. 30, 2021

(30) Foreign Application Priority Data
Nov. 1, 2018   (TR) .................. 2018/16308

(51) Int. Cl.
*A47J 37/04*    (2006.01)
*A47J 36/32*    (2006.01)
*A47J 37/07*    (2006.01)
*F28F 13/00*    (2006.01)

(52) U.S. Cl.
CPC ............. *A47J 37/043* (2013.01); *A47J 36/32* (2013.01); *A47J 37/0786* (2013.01); *F28F 13/00* (2013.01); *A47J 37/04* (2013.01)

(58) Field of Classification Search
CPC ........ A47J 37/043; A47J 37/04; F24C 15/164
USPC ...................................... 99/421 V
See application file for complete search history.

(56) References Cited

U.S. PATENT DOCUMENTS

| | | | | |
|---|---|---|---|---|
| 4,810,856 A | * | 3/1989 | Jovanovic | A47J 27/04 219/401 |
| 5,662,028 A | * | 9/1997 | Fraga | A47J 37/049 99/421 H |
| 5,918,534 A | * | 7/1999 | Medina | A47J 37/041 99/421 A |

(Continued)

*Primary Examiner* — Reginald Alexander
(74) *Attorney, Agent, or Firm* — Bayramoglu Law Offices LLC

(57) ABSTRACT

A portable rotisserie spit includes a main body including an outer tube and an inner tube; a first fluid passage hole provided on one end of the main body and connected to the outer tube; a second fluid passage hole provided on one end of the main body and connected to the inner tube; a cooling chamber, which is connected to the first fluid passage hole and second fluid passage hole, and includes a first part and a second part; a compressor, which is connected to the first fluid passage hole and the cooling chamber, and which is provided for delivering the coolant in the cooling chamber to the main body in a pressurized manner; a motor, a motor lower connection and a motor shaft provided for rotation of the rotisserie spit and for connection thereof to the machine.

4 Claims, 3 Drawing Sheets

(56) References Cited

U.S. PATENT DOCUMENTS 7,628,105 B2 * 12/2009 Umit .................... A47J 37/043
99/421 V

* cited by examiner

PORTABLE ROTISSERIE SPIT

CROSS REFERENCE TO THE RELATED APPLICATIONS

This application is the national phase entry of International Application No. PCT/TR2019/050912, filed on Oct. 31, 2019, which is based upon and claims priority to Turkish Patent Application No. 2018/16308, filed on Nov. 1, 2018, the entire contents of which are incorporated herein by reference.

TECHNICAL FIELD

The present invention relates to a spit that enables to cool and heat food items (doner, etc.), which are stacked on top of each other around (on) a main body, from the center.

BACKGROUND

The said rotisserie (doner kebap) spits generally work together with a heat emitting member (grill, etc.) to heat and roast the food items, which are mounted on the spit, from outside.

The doner spits are generally placed vertically on the grill machines, and the pieces of meat are skewered on a vertically positioned spit body one by one to be stacked on top of each other. Upon completion of the stacking process, the rotisserie spit, which is connected to a heat emitting element such as a grill on the machine, begins to be rotated for cooking the food item thereon. The meat layer, which starts to be roasted on the outer surface, is cut (shaved off) with the help of a knife from top to bottom. After the top layer is shaved off, the meat layer under it which is not yet cooked is heated and starts to be cooked.

Due to its rich nutritional content, meat is an ideal medium for growth and proliferation of microorganisms. Especially, storing meats that are marinated with additives such as spices at inappropriate conditions, and keeping them wait for a long period of time while being exposed to the cooker during cooking cause the temperature in the inner parts of the doner meat close to the main body of the spit to reach an ideal level for the microorganisms.

United States Patent document no U.S. Pat. No. 5,918,534, an application known in the state of the art, discloses a cooking spit with a hollow interior. A heat transfer medium is passed through the hollow part in the spit. In the present invention, by means of the heat transfer medium, heat is transferred to the food item (doner, meat, etc.) that is mounted on the spit to be roasted in order to reduce the cooking time of the food item. When the doner mounted on the spit is left to cool, the heat in the food item is transferred outside by means of the heat transfer medium. However, when the said document is examined, the fact that the food item intended to be cooked is not mounted on the spit but onto the hooks positioned on the spit causes reduction of the amount of food item to be mounted. Another negative feature is that the spit disclosed in the document is not suitable for every rotisserie machine. In addition, the cooling system continuously operates with the same performance; and since the amount of meat on the spit cannot be determined, the performance does not vary according to the amount of meat, which causes futile operation of the system.

SUMMARY

The objective of the present invention is to provide an innovative portable cooling system to prevent loss of the microbiological quality the doner meat. Cooling and freezing is the most common method used for healthy storage of the meat products. With the rotisserie spit that is developed, the doner meat will be directly cooled, thus the efficiency of the invention will be higher compared to non-direct cooling systems.

BRIEF DESCRIPTION OF THE DRAWINGS

An innovative portable rotisserie spit developed to fulfill the objective of the present invention is illustrated in the accompanying figures wherein.

Figure 1:
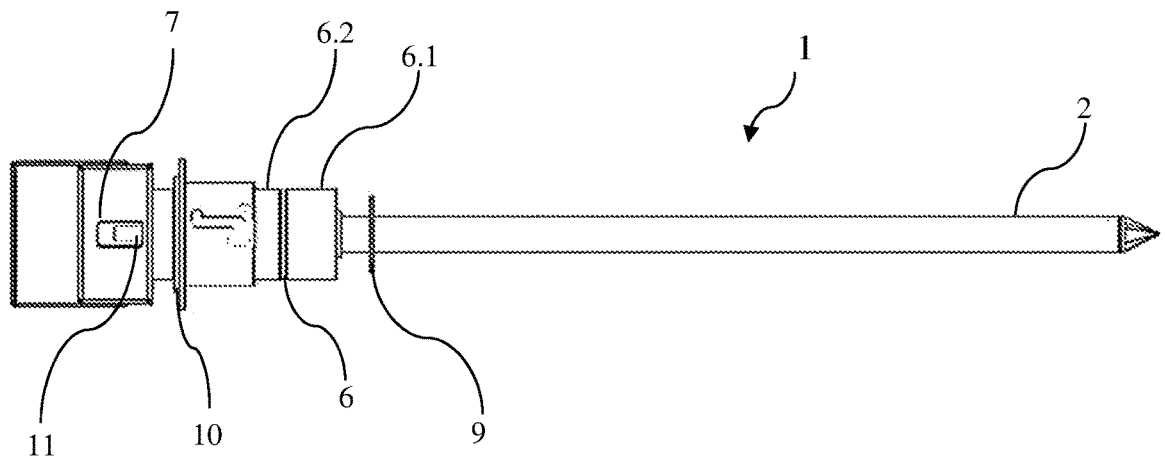
FIG. 1. is a profile view of the innovative portable rotisserie spit.
Figure 2:
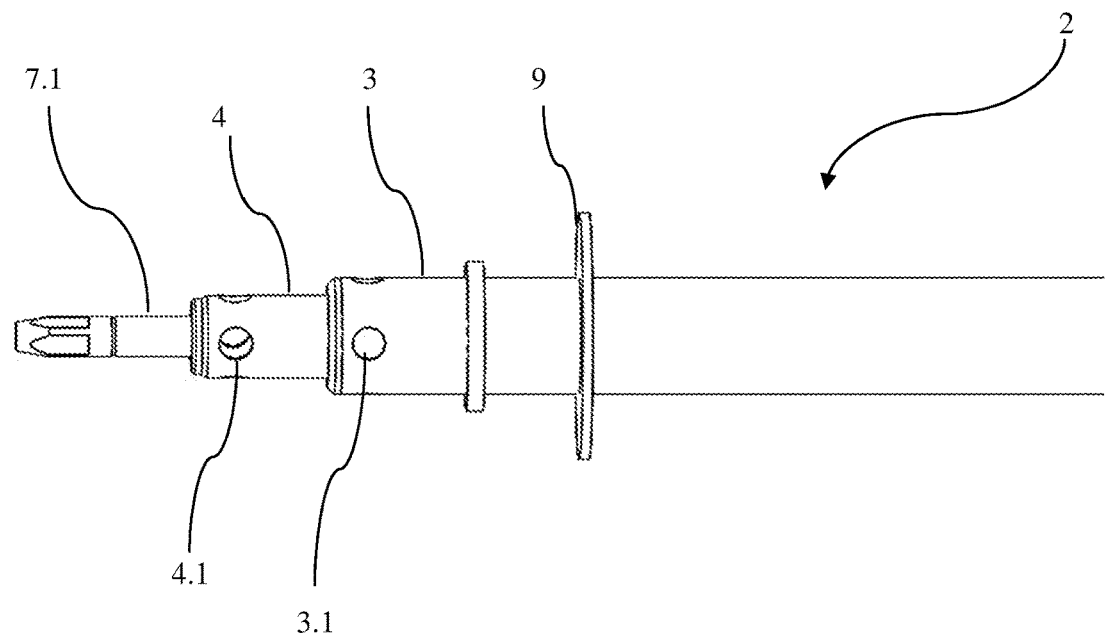
FIG. 2. is a profile view of the innovative portable rotisserie spit.

The components in the figures are given reference numbers as follows:
1. Innovative Portable Rotisserie Spit
2. Main Body
3. Outer tube
   3.1. Fluid passage hole
4. Inner tube
   4.1. Fluid passage hole
5. Compressor
6. Cooling chamber
   6.1. First Part
   6.2. Second Part
7. Motor lower connection
   7.1. Motor Shaft
8. Middle Tube
9. Supporting base
10. Scale
11. Valve
K. Control unit
M. Motor

DETAILED DESCRIPTION OF THE EMBODIMENTS

The innovative portable rotisserie spit (1) of the present invention comprises a main body (2) and enables to maintain the inner core (center) parts of the food items mounted on the main body (2) below a certain temperature so that the said food items can remain fresh for a long time. This ensures that the doner meat is cooked without losing its moisture. In the main body (2), there are provided two nested tubes, one outer tube (3) and one inner tube (4), for cooling the main body (2). In another alternative embodiment of the invention, there is provided a middle tube (8) at the middle part of the outer tube (3) and the inner tube (4).

A fluid passage bole (3.1, 4.1) is provided on both the outer tube (3) and the inner tube (4). The outer tube (3) and the inner tube (4) are connected to the cooling chamber (6), which is comprised of at least two compartments, namely a first part (6.1) and a second part (6.2), via a first fluid passage hole (3.1) and a second fluid passage bole (4.1). The coolant (air, gas, liquid, nano-fluid, etc.) travels to the first part (6.1) of the cooling chamber (6) by means of a compressor (5). The coolant in the first part (6.1), which is connected to the outer tube (3) via a first fluid passage hole (3.1), is delivered to the outer tube (3) via the first fluid passage hole (3.1). This way, heat is transferred to the food item placed around the main body (2) and the layers approaching the cutting process are enabled to remain moist and cold. The food item, which is kept cold and moist, preserves its freshness.

While the food item is cooling, the coolant is heated and is delivered back, for being recooled, to the second part (6.2) within the cooling chamber (6) via the second fluid passage hole (4.1) provided on the inner tube (4) that is located inside the outer tube (3). The coolant circulating from the inner tube (4) to the second part (6.2) and the coolant contained in the first part (6.1) for being sent to the outer tube (3) do not mix with each other.

At the lower part of the spit (1), there is provided a supporting base (9) which serves as a base structure for stacking the meat or meat products on top of each other and which is welded to the outer tube (3).

At the bottom of the said supporting base (9), a scale (10) is used to weigh the tared meat and determine the amount of meat mounted on the spit (1). The information of the amount of meat determined on the scale (10) is transferred to a control unit (K) provided in the system. By altering the operation intervals of the compressor (5) in accordance with the signal transmitted from the control unit (K); the amount, temperature and pressure of the coolant to be delivered by the compressor (5) to the spit (1) can be changed according to the amount of meat mounted on the spit (1).

An electronically or mechanically operated valve (11) is provided at the inlet or outlet point of the fluid or at both points. The flow is stopped by means of the said valve (11), and the valve (11) is operational during replacement of the spits. When the meat mounted on the spit (1) is finished, a new spit must be installed. Prior to this process, the valve (11) is closed unilaterally and the fluid in the spit (1) is vacuumed so as to be drawn into the system. This way, saving is achieved by keeping the fluid in the system during the replacement of the spit (1). When another unilateral closing is performed, the air inside the newly installed spit (1) is vacuumed, and presence of air in the coolant to be supplied to the spit is completely prevented.

There is provided a motor (M) which enables the rotational movement of the spit. The spit (1) and the motor (M) are connected by means of a motor lower connection (7) and motor shaft (7.1). The rotational movement coming from the motor (M) is transmitted to the motor shaft (7.1) by the motor lower connection (7). The motor shaft (7.1) transmits the movement received from the motor lower connection (7) to the spit (1). In machines with bottom motor, the innovative portable rotisserie spit's (1) main body (2), which is connected to the motor (M) by means of the motor lower connection (7), rotates completely. In the event of a power failure, malfunction or danger, the system is switched off by means of the emergency button provided on the control unit (K), or it is allowed to be used as a conventional rotisserie spit.

In another alternative embodiment of the invention, fins are disposed within the tubes providing cooling for enhancing heat transfer, and the heat transfer increases as the surface area of these fins are increased.

Figure 3:
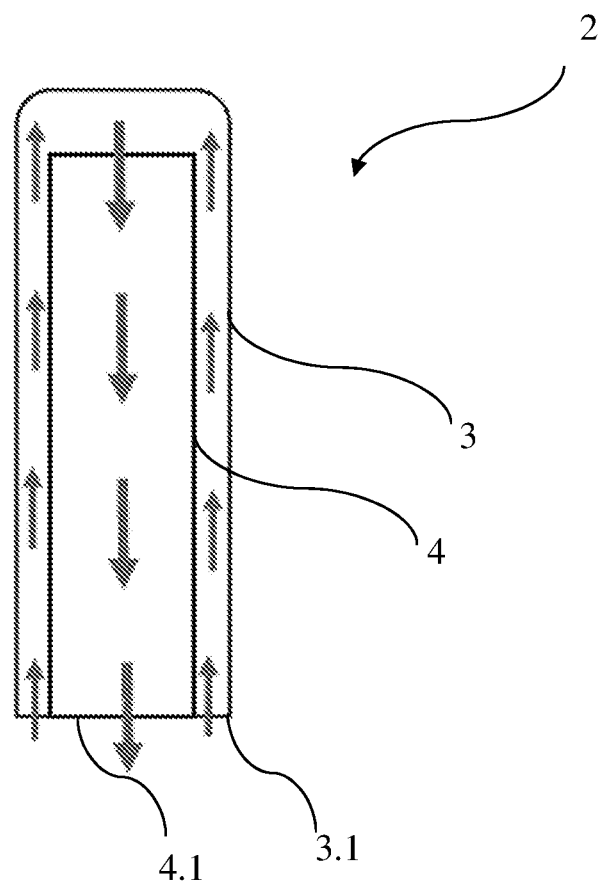
FIG. 3. is a schematic view of the coolant within the tubes.
Figure 4:
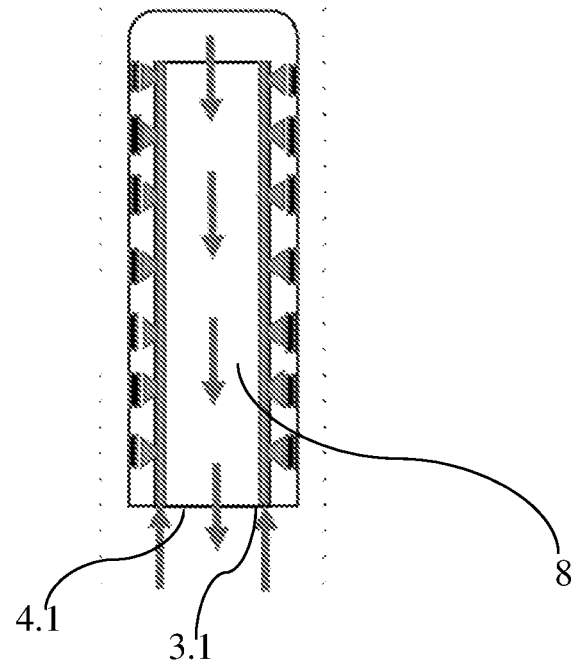
FIG. 4. is a schematic view of the innovative portable rotisserie spit wherein jets and fins are used to enhance heat transfer efficiency.
Figure 5:
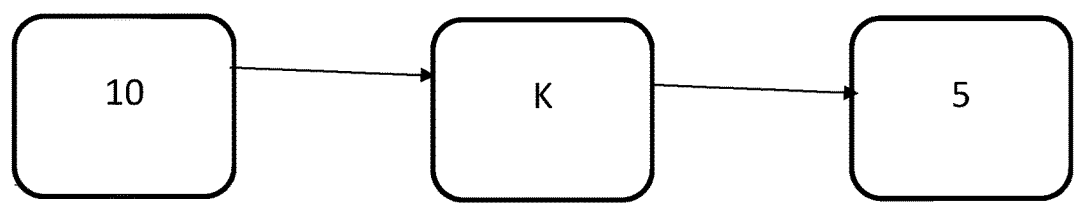
FIGS. 5 and 6. is a schematic view of the data transfer of the control unit.
Figure 6:
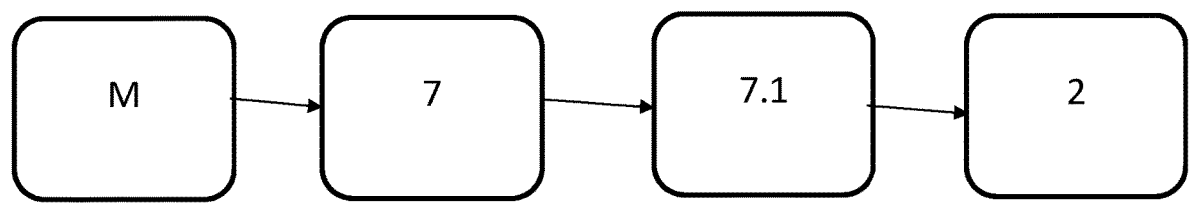

In a further alternative embodiment of the invention, three tubes are used instead of two tubes, and the coolant is allowed to enter through the middle tube and heat transfer is enhanced by means of the jets and fins (FIG. 3).

What is claimed is:

1. A portable rotisserie spit, comprising
a main body, wherein the main body comprises an outer tube and an inner tube;
a first fluid passage hole, wherein the first fluid passage hole is provided on an end of the main body and the first fluid passage hole is connected to the outer tube;
a second fluid passage hole, wherein the second fluid passage hole is provided on the end of the main body and the second fluid passage hole is connected to the inner tube;
a cooling chamber, wherein the cooling chamber is connected to the first fluid passage hole and second fluid passage hole, and the cooling chamber comprises a first part and a second part;
a compressor, wherein the compressor is connected to the first fluid passage hole and the cooling chamber, and the compressor is provided for delivering a coolant in the cooling chamber to the main body in a pressurized manner;
a motor, a motor lower connection and a motor shaft, wherein the motor, the motor lower connection and the motor shaft are provided for rotating the portable rotisserie spit and connecting the portable rotisserie spit to a grill machine;
a supporting base, configured for supporting meat stacked on the main body;
a scale, configured for determining an amount of the meat mounted on the portable rotisserie spit;
an electronic valve or a mechanical valve, configured for stopping a flow of the coolant and restoring the flow of the coolant after the flow is stopped; and
a control unit, wherein the control unit is provided between the compressor and the scale to determine an amount, a pressure and a temperature of the coolant to be delivered to the portable rotisserie spit in accordance with the amount of the meat on the portable rotisserie spit.

2. The portable rotisserie spit according to claim 1, wherein jets and fins are positioned between the outer tube and the inner tube to enhance heat transfer between the coolant and the meat.

3. A portable rotisserie spit, comprising
a main body, wherein the main body comprises an outer tube, a middle tube and an inner tube;
a first fluid passage hole, wherein the first fluid passage hole is provided on an end of the main body and the first fluid passage hole is connected to the middle tube;
a second fluid passage hole, wherein the second fluid passage hole is provided on a coolant in the cooling chamber to the main body in a pressurized manner;
a motor, a motor lower connection and a motor shaft, wherein the motor, the motor lower connection and the motor shaft are provided for rotating the portable rotisserie spit and connecting the portable rotisserie spit to a grill machine,
a supporting base, configured for supporting meat stacked on the main body,
a scale, configured for determining an amount of the meat mounted on the portable rotisserie spit,
an electronic valve or a mechanical valve, configured for stopping a flow of the coolant and restoring the flow of the coolant after the flow is stopped,
a control unit, wherein the control unit is provided between the compressor and the scale to determine an amount, a pressure and a temperature of the coolant to be delivered to the portable rotisserie spit in accordance with the amount of the meat on the portable rotisserie spit.

4. The portable rotisserie spit according to claim 3, wherein jets and fins are positioned between the outer tube and the inner tube to enhance heat transfer between the coolant and the meat.

* * * * *